(12) United States Patent
Igarashi

(10) Patent No.: US 8,219,597 B2
(45) Date of Patent: Jul. 10, 2012

(54) INFORMATION PROCESSING APPARATUS AND METHOD

(75) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 12/329,370

(22) Filed: Dec. 5, 2008

(65) Prior Publication Data

US 2009/0150458 A1 Jun. 11, 2009

(30) Foreign Application Priority Data

Dec. 7, 2007 (JP) ................. 2007-317281

(51) Int. Cl.
*G06F 17/30* (2006.01)

(52) U.S. Cl. .................................................... 707/809

(58) Field of Classification Search .......... 707/638, 707/999.203, 809
See application file for complete search history.

(56) References Cited

U.S. PATENT DOCUMENTS

| 4,558,413 | A  | * | 12/1985 | Schmidt et al. | 717/170 |
| 5,155,847 | A  | * | 10/1992 | Kirouac et al. | 709/221 |
| 5,862,325 | A  | * | 1/1999  | Reed et al.    | 709/201 |
| 6,199,204 | B1 | * | 3/2001  | Donohue        | 717/178 |
| 6,202,207 | B1 | * | 3/2001  | Donohue        | 717/173 |
| 6,308,178 | B1 | * | 10/2001 | Chang et al.   | 1/1     |
| 7,072,913 | B2 | * | 7/2006  | Jans et al.    | 1/1     |

FOREIGN PATENT DOCUMENTS

| JP | 2003-36181  | 2/2003 |
| JP | 2006-072526 | 3/2006 |

* cited by examiner

*Primary Examiner* — Sheree Brown
(74) *Attorney, Agent, or Firm* — Canon U.S.A., Inc. IP Division

(57) ABSTRACT

An information processing apparatus configured to allow a new version of software to be executed therein is provided. The information processing apparatus acquires management information in a format corresponding to an old version of the software and converts the acquired management information into a format corresponding to the new version of the software. When converting data, the information processing apparatus adds a new value to a management item that is common to the formats of the management information of the old version and the new version of the software so that the value is suitable for the new version of the software.

13 Claims, 18 Drawing Sheets

FIG. 5A

| | | |
|---|---|---|
| 5010 → | USER ID | 1 |
| 5020 → | USER NAME | suzuki |
| 5030 → | FULL USER NAME | suzuki taro |
| 5040 → | E-MAIL ADDRESS | suzuki@aaa.com |

| | | |
|---|---|---|
| 5110 → | USER ID | 2 |
| 5120 → | USER NAME | suzuki |
| 5130 → | FULL USER NAME | suzuki taro |
| 5140 → | E-MAIL ADDRESS | suzuki@aaa.com |
| 5150 → | LAST LOGIN TIME | 08/09/2007 12:34 |

| | | |
|---|---|---|
| 7010 | TASK ID | 1 |
| 7020 | TASK NAME | TASK 1 |
| 7030 | USER ID | 1 |
| 7040 | DEVICE ID | 11:22:33:44:55:66<br>11:22:33:44:55:67 |
| 7050 | TASK INFORMATION | DELIVERY OF DESTINATION TABLE |

| | | |
|---|---|---|
| 7110 | TASK ID | 2 |
| 7120 | TASK NAME | TASK 1 |
| 7130 | USER ID | 2 |
| 7140 | DEVICE ID | 11:22:33:44:55:66<br>11:22:33:44:55:67 |
| 7150 | TASK INFORMATION | DELIVERY OF DESTINATION TABLE |

| | | |
|---|---|---|
| 8010 | DESTINATION TABLE ID | 1 |
| 8020 | DESTINATION TABLE NAME | AddressBook 1 |
| 8030 | USER ID | 1 |
| 8040 | DESTINATION ID | 1 |
| 8050 | DEVICE ID | 11:22:33:44:55:66 |

| | | |
|---|---|---|
| 8110 | DESTINATION TABLE ID | 2 |
| 8120 | DESTINATION TABLE NAME | AddressBook 1 |
| 8130 | USER ID | 2 |
| 8140 | DESTINATION ID | 1 |
| 8150 | DEVICE ID | 11:22:33:44:55:66 |

| | | |
|---|---|---|
| 9010 | DESTINATION ID | 1 |
| 9020 | DESTINATION TYPE | Fax |
| 9030 | NAME | SUZUKI |
| 9040 | FAX NUMBER | 03-1111-2222 |
| 9050 | E-MAIL ADDRESS | suzuki@aaa.com |

FIG. 9B

| | | |
|---|---|---|
| 9110 | DESTINATION ID | 1 |
| 9120 | DESTINATION TYPE | Fax |
| 9130 | NAME | SUZUKI |
| 9140 | FAX NUMBER | 03-1111-2222 |
| 9150 | E-MAIL ADDRESS | suzuki@aaa.com |
| 9160 | I-FAX ADDRESS | |

FIG. 10

| | | |
|---|---|---|
| 1010 | DATA MIGRATION STATUS | "READY FOR DATA MIGRATION" |
| 1020 | PROCESSING PROGRESS | 0% |
| 1030 | PLUG-IN ID | 0 |

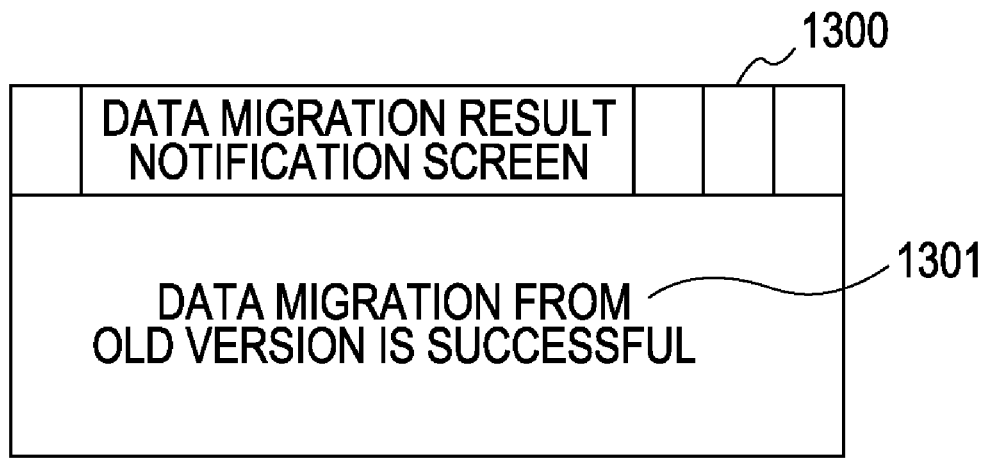
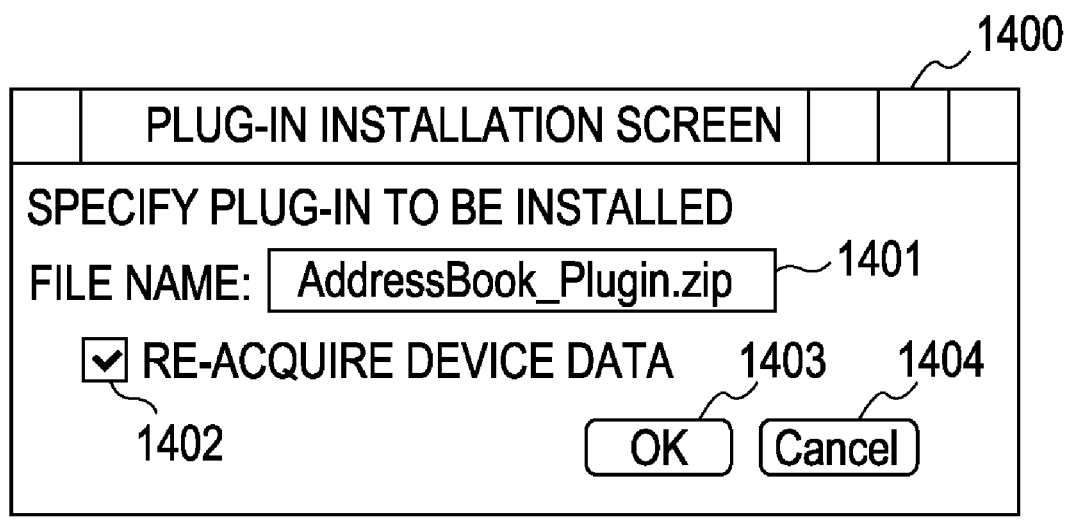

FIG. 16

| | | |
|---|---|---|
| 1610 | PLUG-IN ID | 1 |
| 1620 | PLUG-IN NAME | DESTINATION TABLE |
| 1630 | STORAGE LOCATION | C:\AddressBook |
| 1640 | PLUG-IN STATUS | STARTED |

INFORMATION PROCESSING APPARATUS AND METHOD

BACKGROUND OF THE INVENTION

1. Field of the Invention

The present invention relates to an information processing apparatus and a method for information processing for data migration used when software for managing network devices is upgraded to a new version.

2. Description of the Related Art

A technology for migrating data used in an old version of software installed and operated in an information processing apparatus into a new version when the software is upgraded has been developed.

Japanese Patent Laid-Open No. 2003-36181 describes a technology applied when data used in an old version is migrated into a new version in an environment in which the old version and the new version coexist. More specifically, data in the old version is migrated into a new version when the data needs to be used in the new version.

On the other hand, for a print processing system in which a printing apparatus is connected to an information processing apparatus, such as a personal computer (PC), a technology for upgrading a version of software installed in the information processing apparatus has been developed. In order to expand the function of an image processing apparatus, Japanese Patent Laid-Open No. 2006-072526 describes a technology for adding an extension to the image processing apparatus (or the above-described software) in the form of a "plug-in". In addition, a technology is described in which a setup program determines whether the function of the installed plug-in can be effective in a printing apparatus and, only if the function of the installed plug-in is effective, the plug-in is activated.

The system described in Japanese Patent Laid-Open No. 2003-36181 has an advantage in that a downtime of a database is not necessary, since the data is migrated when a user accesses data of the old version through a new version of the software.

However, for software that needs to migrate a large amount of data, the response time of processing other than data migration increases during execution of data migration. Thus, the usability of the software for the user may be decreased. In addition, since a long time is required until the data migration is completed, the old version of the software needs to be running for a long time. For example, when the progress of migration processing is monitored through a web page without interrupting the migration processing, the display of the web page may time out during the long migration processing, and therefore, the system may not inform the user of the progress or completion of the data migration processing.

In addition, in the system described in Japanese Patent Laid-Open No. 2006-072526, update of the software and update of the plug-in are concurrently performed. The migration processing when update of the software and update of the plug-in are performed at different points of time is not described. Accordingly, if the software and the plug-in are upgraded to new versions in the following sequences (0) to (3), the migrated data may have some defect:

(0) The old versions of the software and plug-in are operated.

(1) The old version of the software is upgraded to a new version. However, the plug-in is not upgraded.

(2) The software and plug-in are operated for a certain period of time. Thus, the management information and the operating environment are changed due to the operation.

(3) The old version of the plug-in is upgraded to a new version.

In addition, after the data is migrated, reconstruction of the data using the new version of the plug-in may be needed.

SUMMARY OF THE INVENTION

The present invention provides an information processing apparatus and method for performing appropriate data migration between different versions of software.

According to an embodiment of the present invention, an information processing apparatus configured to allow first software to be executed therein is provided. The first software manages a network device communicable via a network using management information regarding the network device stored in a database. The apparatus includes a data migrating unit configured to acquire management information in a format corresponding to second software of a version different from a version of the first software, convert the management information in a format corresponding to the second software into a format corresponding to the first software, and register the converted management information in the database and a control unit configured to receive an instruction of performing a data migration process, in which the management information in the format corresponding to the second software is migrated to data used by the first software, and start the data migrating process in accordance with the received instruction. The data migrating unit converts the management information by adding a new value to a management item that is common to the formats of the management information of the first and second software so that the value is suitable for the first software.

According to another embodiment of the present invention, an information processing apparatus configured to allow first software to be executed therein is provided. The first software manages a network device communicable via a network using management information regarding the network device stored in a database. The apparatus includes a data migrating unit configured to acquire management information in a format corresponding to second software of a version different from a version of the first software, convert the management information in a format corresponding to the second software into a format corresponding to the first software, and register the converted management information in the database and a control unit configured to receive an instruction of performing a data migration process in which the management information in a format corresponding to the second software is migrated to data used by the first software and start the data migrating process in accordance with the instruction. Execution of the control unit and execution of the data migrating unit are started in different processes.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIGS. 5A and 5B illustrate examples of user tables.

FIGS. 7A and 7B illustrate examples of task tables.

FIGS. 8A and 8B illustrate examples of destination listing tables.

FIGS. 9A and 9B illustrate examples of destination tables.

FIG. 10 illustrates an exemplary processing progress information table.

FIG. 13 illustrates an exemplary data migration result notification screen according to the first exemplary embodiment of the present invention.

FIG. 14 illustrates an example of a plug-in installation screen.

FIG. 16 illustrates an example of a plug-in information table.

DESCRIPTION OF THE EMBODIMENTS

A first exemplary embodiment of the present invention is described below with reference to the accompanying drawings.

In the first exemplary embodiment, an exemplary operation performed when software installed in an image processing apparatus is upgraded to a new version.

Figure 1:
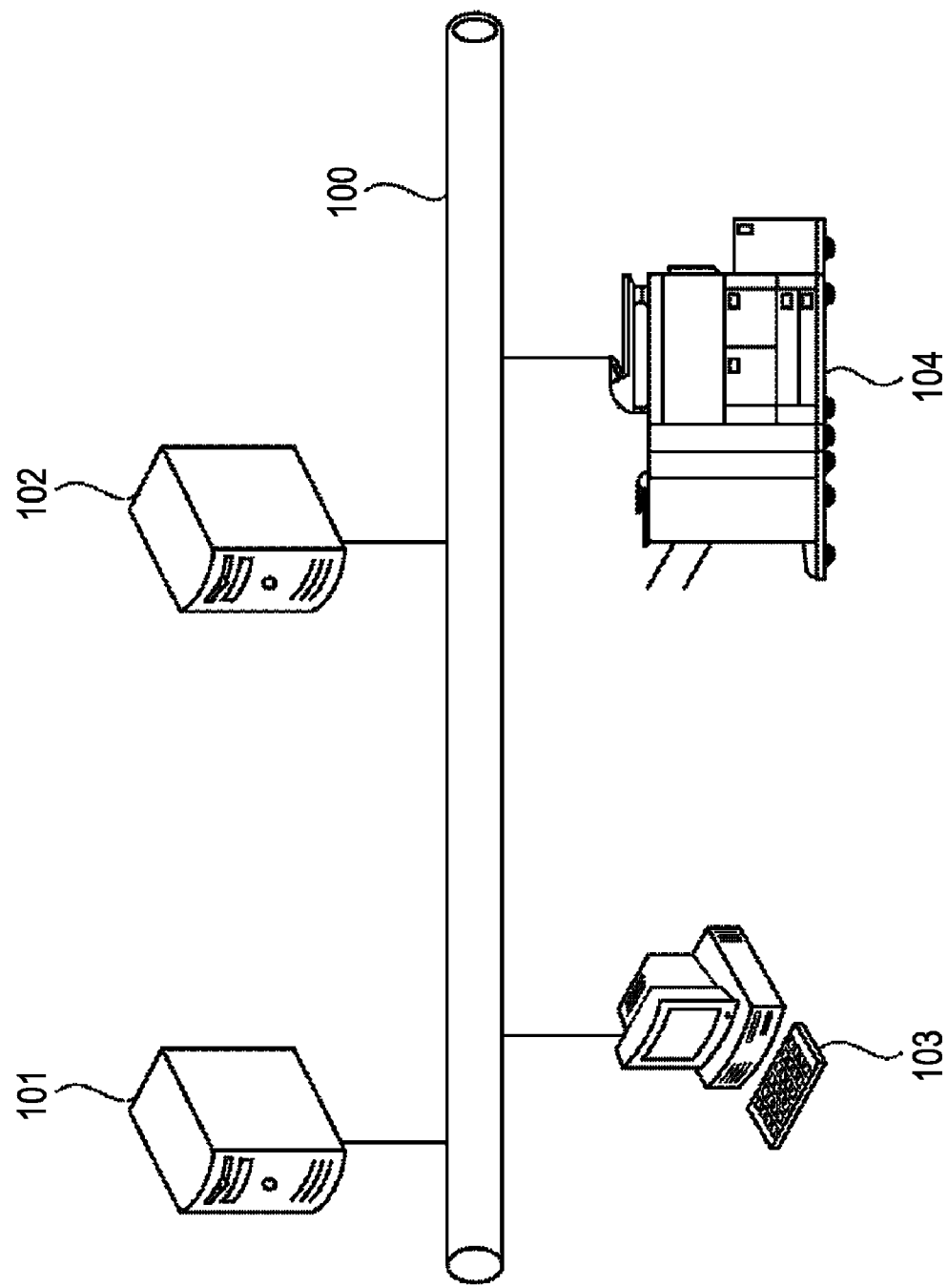
FIG. 1 illustrates an exemplary configuration of a system according to a first exemplary embodiment of the present invention.

FIG. 1 illustrates an exemplary configuration of a system in which an image processing apparatus according to the present embodiment operates.

As shown in FIG. 1, the system includes information processing apparatuses 101 and 102 in which software described in the present embodiment is executed. However, according to the present embodiment, the information processing apparatus 101 stores an old version of information processing software (second software). In contrast, the information processing apparatus 102 stores a new version of the information processing software (first software). Since the versions are different, data manipulated by the software and the functions of the software are different. The information processing software according to the present embodiment primarily manipulates information relating to tasks that process network device information, such as device information about an image forming apparatus connected to a network, and that control the network devices. Note that the image forming apparatus is described below.

As shown in FIG. 1, the system includes a client PC 103.

According to the present embodiment, a user instructs the information processing apparatuses 101 and 102 to perform various processing using a Web browser running on the client PC 103. However, the user can send an instruction to the information processing apparatuses 101 and 102 using other tools, such as a command line tool.

Alternatively, the instruction for the information processing apparatuses 101 and 102 may be sent from another PC including the information processing apparatuses 101 and 102, not the client PC.

As shown in FIG. 1, the system includes a multifunction peripheral 104.

These devices are connected to a local area network (LAN) 100.

Figure 2:
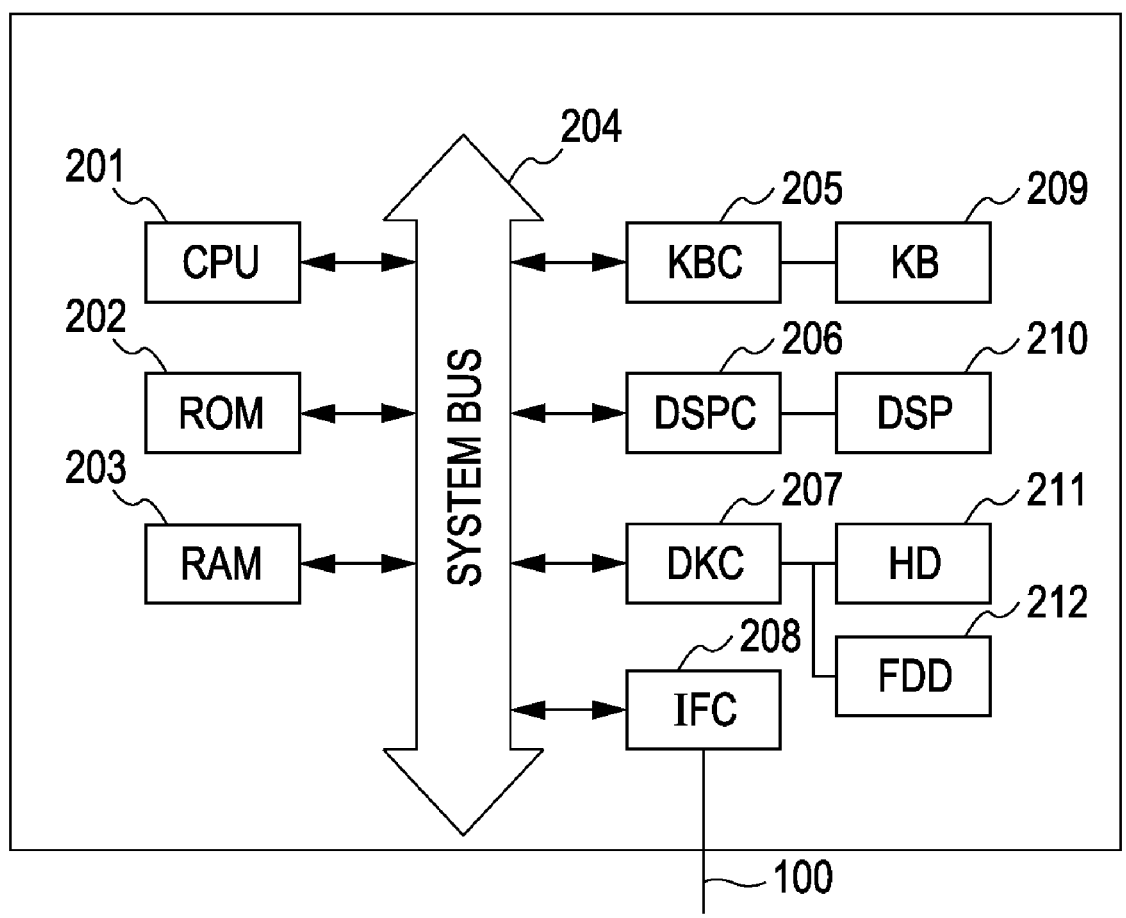
FIG. 2 illustrates an exemplary internal configuration of a PC.

FIG. 2 illustrates an exemplary internal configuration of the information processing apparatus.

According to the present embodiment, the information processing apparatuses (the information processing apparatuses 101 and 102 shown in FIG. 1) are achieved in a PC having a configuration the same as that of the PC that can realize the information processing apparatus shown in FIG. 2. A hard disk (HD) 211 stores an information processing software program according to the present embodiment. The information processing software program is a main program providing all of the operations described below. In all of the following descriptions, in terms of hardware, a central processing unit (CPU) 201 performs the operations, unless expressly specified otherwise. In addition, in terms of software, the information processing software stored in the HD 211 performs the operations.

A read only memory (RAM) 203 functions as a main memory and a work area of the CPU 201. A keyboard controller (KBC) 205 controls input of instructions through a keyboard (KB) 209 and a pointing device (not shown). A display controller (DSPC) 206 controls the display operation performed by a display (DSP) 210. A disk controller (DKC) 207 controls access of storage units, such as a compact disk-read only memory (CD-ROM) (not shown), the HD 211, and a floppy disk controller 212. The HD 211 and the floppy disk (FD) controller 212 store a boot program, an operating system (OS), a database, information processing applications, and data used by these programs. An interface controller 208 transmits and receives information to and from other network devices via the LAN 100.

According to the present embodiment, Microsoft Windows® operating system is used as an OS. However, the OS is not limited to Windows®.

In addition, the information processing program according to the present embodiment may be supplied in the form of a storage medium, such as a floppy disk or a CD-ROM, including the information processing program. In such a case, the information processing program is read from the storage medium by the floppy disk controller 212 shown in FIG. 2 or a CD-ROM drive (not shown) and is installed in the HD 211.

Figure 3:
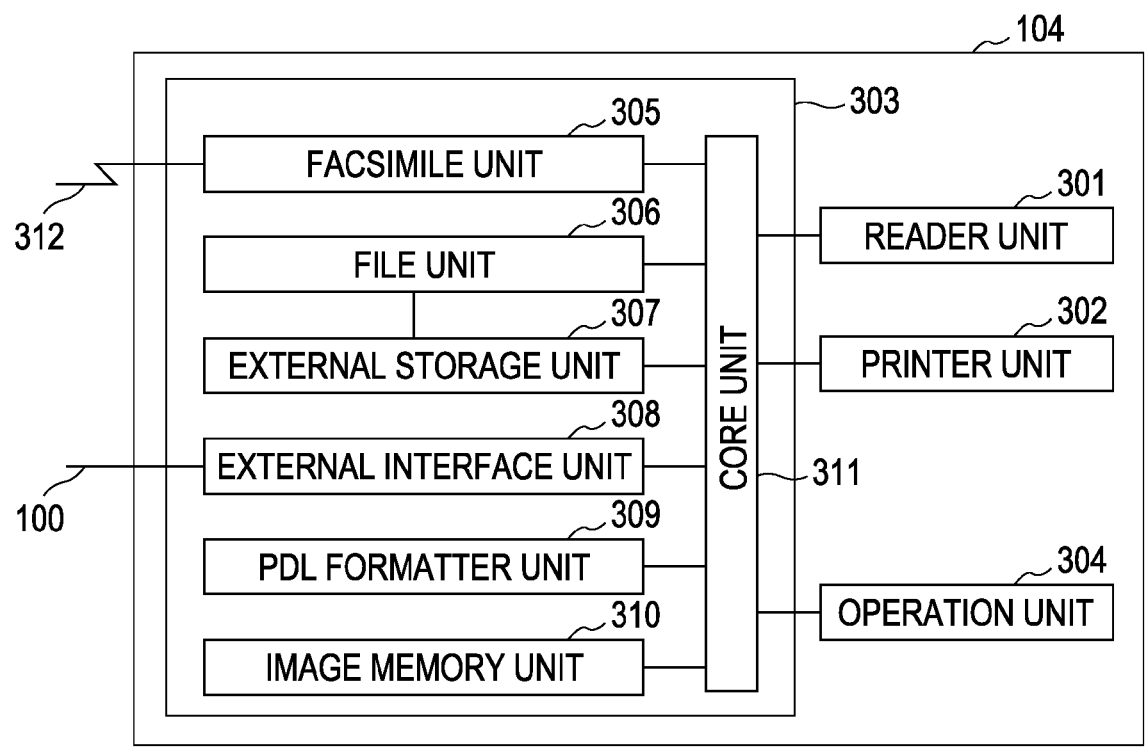
FIG. 3 illustrates an exemplary internal configuration of a multifunction peripheral.

FIG. 3 illustrates an exemplary internal configuration of the multifunction peripheral 104. As shown in FIG. 3, the multifunction peripheral 104 includes a scanner, a printer, a copier, and a facsimile integrated therein. The multifunction peripheral 104 is connected to other communication devices via a public line 312. Examples of an image forming apparatus include a multifunction peripheral, a digital copier, a printer with a copier function, and a single-function printer. However, according to the present embodiment, the multifunction peripheral 104 is used as an example.

The multifunction peripheral 104 includes a reader unit 301, a printer unit 302, an image input and output control unit 303, and an operation unit 304.

The reader unit 301 is connected to the printer unit 302 and the image input and output control unit 303. In response to an instruction sent from the operation unit 304, the reader unit 301 scans a document and outputs scanned image data to the printer unit 302 and the image input and output control unit 303.

The printer unit 302 prints the image data output from the reader unit 301 and the image input and output control unit 303 on a sheet of paper.

The image input and output control unit 303 is connected to a LAN or a public line so as to input and output image data. In addition, the image input and output control unit 303 analyzes a job and controls the job. The image input and output control unit 303 includes a facsimile unit 305, a file unit 306, an external interface unit 308, a PDL formatter unit 309, an image memory unit 310, and a core unit 311.

The operation unit 304 accepts a user input operation.

The facsimile unit 305 is connected to the core unit 311 and a public line. The facsimile unit 305 decompresses compressed image data received via the public line and transmits the decompressed image data to the core unit 311. In addition, the facsimile unit 305 compresses image data transmitted from the core unit 311 and transmits the compressed image data to the public line.

A file unit 306 is connected to the core unit 311 and an external storage unit 307. The file unit 306 instructs the external storage unit 307 to store the image data transmitted from the core unit 311 and a result of execution of a device control command together with a keyword used for searching for the image data. The external storage unit 307 is formed from, for example, a hard disk. In addition, the file unit 306 reads the image data and the result of execution of a device control command stored in the external storage unit 307 using a keyword sent from the core unit 311. The file unit 306 then transmits the image data and the result of execution of a device control command to the core unit 311.

The external interface unit 308 serves as an interface between another network device and the core unit 311. Job control data, image data, or a device control command is communicated with another network device via the external interface unit 308. The job control data includes a job control instruction sent together with PDL data. For example, a job control instruction instructs decompression of PDL data, printing of the decompressed image data, and output of sheets of paper after stapling and sorting the sheets of paper.

Examples of the device control command include the following:

(1) an information acquiring command for acquiring error information about an error occurring in the multifunction peripheral 104 and various data (e.g., a destination table) stored in the multifunction peripheral 104; and (2) an information delivery command for changing the setting of the multifunction peripheral 104 or delivering various data (e.g., the destination table).

The PDL formatter unit 309 is connected to the core unit 311. The PDL formatter unit 309 decompresses PDL data transmitted from a computer into image data that can be printed by the printer unit 302.

The image memory unit 310 temporarily stores information received from the reader unit 301 and information transmitted from a computer via the external interface unit 308.

The core unit 311 controls data flow between any two of the reader unit 301, the operation unit 304, the facsimile unit 305, the file unit 306, the external interface unit 308, the PDL formatter unit 309, and the image memory unit 310.

Figure 4:
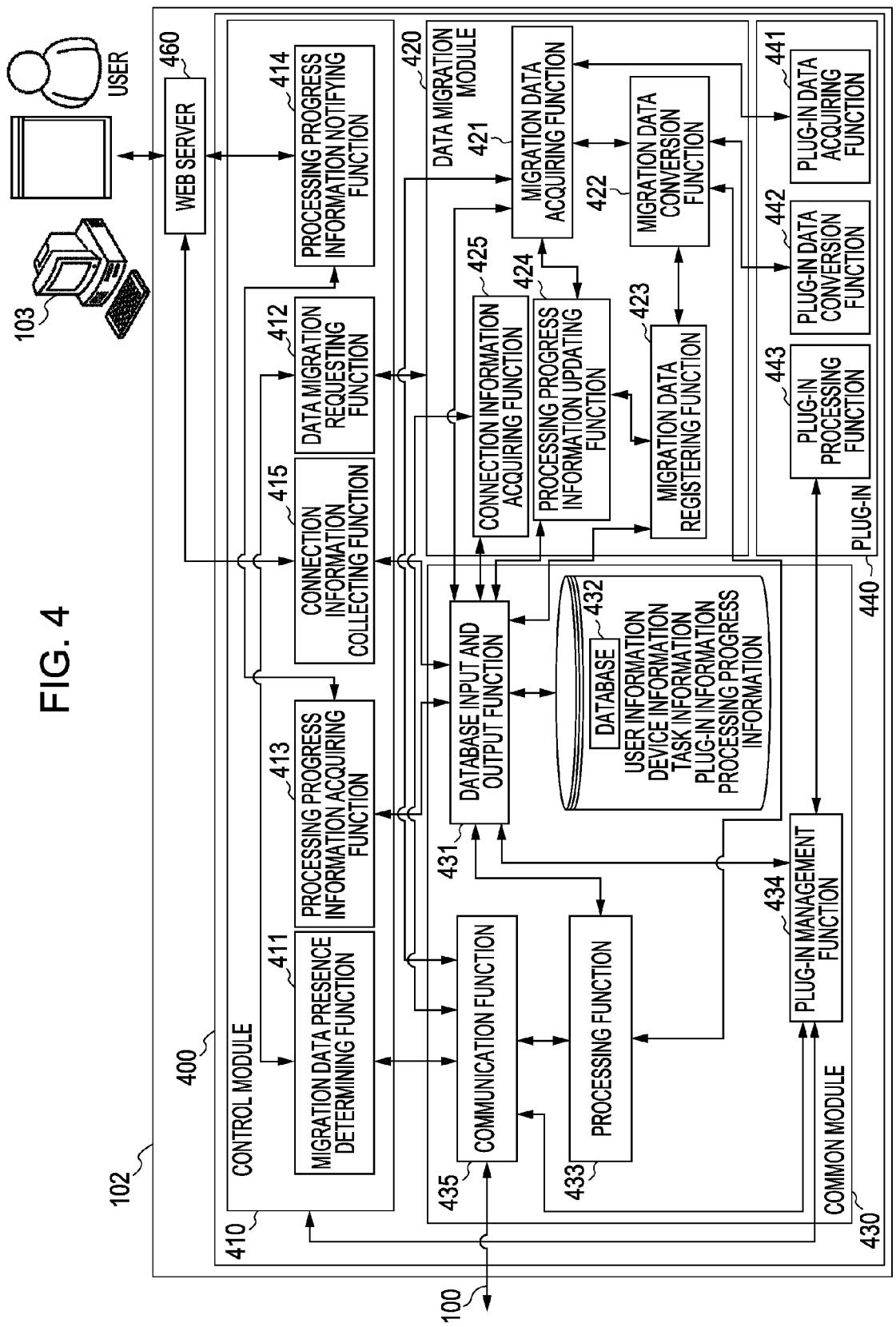
FIG. 4 is a block diagram of an exemplary functional structure of an information processing apparatus.

FIG. 4 is a block diagram of an exemplary functional structure of the information processing apparatus 102. The information processing apparatus 102 controls data migration from the information processing apparatus 101 that stores the old version of the information processing software.

As shown in FIG. 4, a new version of information processing software 400 is stored in the information processing apparatus 102.

The information processing software 400 includes a control module 410, a data migration module 420, a common module 430, and a plug-in module 440.

The control module 410 has a migration data presence determining function 411 used for determining whether a data item to be migrated from the information processing apparatus 101 is present or not.

In addition, the control module 410 has a data migration requesting function 412 used for starting the data migration module 420 so that the data migration module 420 is executed in a different process and requesting the data migration module 420 to migrate data. The data migration module 420 is described in more detail below.

A processing progress information acquiring function 413 acquires processing progress information of the data migration process (refer to FIG. 10) from a database 432 via a database input and output function 431. The processing progress information is managed by the data migration module 420. The processing progress information is prestored in the database 432 by the information processing apparatus 102.

A processing progress information notifying function 414 notifies the user of the processing progress information acquired by the processing progress information acquiring function 413. According to the present embodiment, the processing progress information in the form of an html document is notified to a web browser running on the client PC 103 via a web server 460 stored in the information processing apparatus 102.

A connection information collecting function 415 collects information used for connecting to an old version of the information processing software. In general, the connection information collecting function 415 acquires information input by the user through a web browser via the web server 460. For example, the collected information includes, but not limited to, a server name of a database that the old version of the information processing software uses, the name of the database, an account name, and a password. In addition, the connection information collecting function 415 stores the collected information in the database 432 via the database input and output function 431.

The data migration module 420 is described next.

The data migration module 420 has a migration data acquiring function 421 used for acquiring data from an information processing apparatus for the old version (e.g., the information processing apparatus 101) in response to receipt of a data migration request from the data migration requesting function 412.

The migration data acquiring function 421 acquires the migration data via a communication function 435. A migration data conversion function 422 converts the data of an old version acquired by the migration data acquiring function 421 into a specified format of a new version. A migration data registering function 423 registers the data converted by the migration data conversion function 422 in the database 432 via the database input and output function 431.

A processing progress information updating function 424 monitors the migration data acquiring function 421 and the migration data registering function 423. If the processing progress information about a data migration process is changed, the processing progress information updating function 424 updates the processing progress information stored in the database 432 via the database input and output function 431.

A connection information acquiring function 425 acquires the information that is used for connection to the old version of the information processing software and that is stored in the database 432 by the connection information collecting function 415.

The common module 430 is described next.

The common module 430 has a database input and output function 431 that controls data input and output to and from the database 432.

The database 432 stores management information and task data used for managing a network device. In general, data stored in the database 432 is physically stored in the HD 211 shown in FIG. 2.

A processing function 433 performs processing specific to the information processing software 400 according to the present embodiment. For example, the processing function 433 submits an information acquiring command and an information delivery command to the multifunction peripheral 104. Data needed for the processing (e.g., data to be delivered) is acquired from the database 432 via the database input and output function 431. In addition, the processing result (e.g., received data) is stored in the database 432 via the database input and output function 431.

A plug-in management function 434 performs a management function of the plug-in module 440 (e.g., addition and deletion of the plug-in module 440 to and from the information processing software 400, and update of the plug-in module 440 stored in the information processing software 400).

A communication function 435 transmits and receives an information acquiring command, an information delivery command, or migration data via the interface controller 208 and the LAN 100.

Note that the plug-in module 440, a plug-in data acquiring function 441, a plug-in data conversion function 442, and a plug-in processing function 443 are not described here, since these are described below with reference to a second exemplary embodiment.

The web server 460 receives user input information through a web browser running on the client PC 103 and sends the user input information to the information processing software 400. In addition, the web server 460 receives HTML data sent from the information processing software 400 and displays the HTML data in a screen of the web browser of the client PC 103.

An exemplary structure of data stored in the database 432 is described next.

FIGS. 5A and 5B illustrate exemplary user tables for storing user information used by the old version and the new version of the information processing software. FIG. 5A illustrates an exemplary user table for storing user information used by the old version of the information processing software. In contrast, FIG. 5B illustrates an exemplary user table for storing user information used by the new version of the information processing software. As used herein, the term "user information" refers to information used for managing a user of the system and a user of a network device.

A user table 500 is a user table of an old version. User information 5001 is user information of the old version.

Each of the management data items are described next. A user ID 5010 is uniquely assigned to each of the users. According to the present embodiment, a sequential number is used for the user ID. However, any unique number can be assigned to the user. Examples of the management data items further include a user name 5020, a full user name 5030, and an E-mail address 5040.

A user table 510 is a user table of a new version. User information 5101 is user information of the new version. A user ID 5110 is similar to the user ID 5010. According to the present embodiment, a sequential number is used for the user ID. However, any unique number can be assigned to the user. In addition, the user ID of the new version is not necessarily equal to the user ID of the old version. A user name 5120 is similar to the user name 5020. A full user name 5130 is similar to the full user name 5030. An E-mail address 5140 is similar to the E-mail address 5040. Examples of the management data items further include a last login time 5150. Note that the user information of the old version does not include the last login time 5150.

Figure 6A:
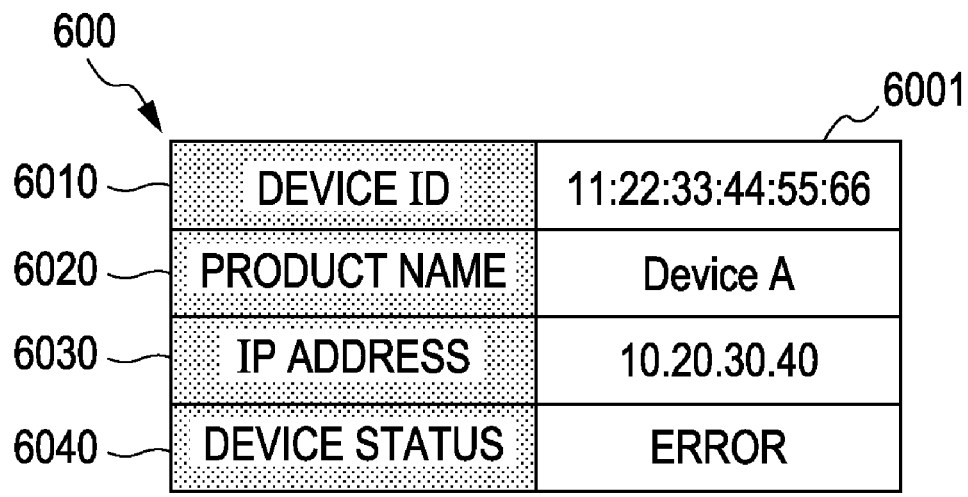
FIGS. 6A and 6B illustrate examples of device tables.
Figure 6B:
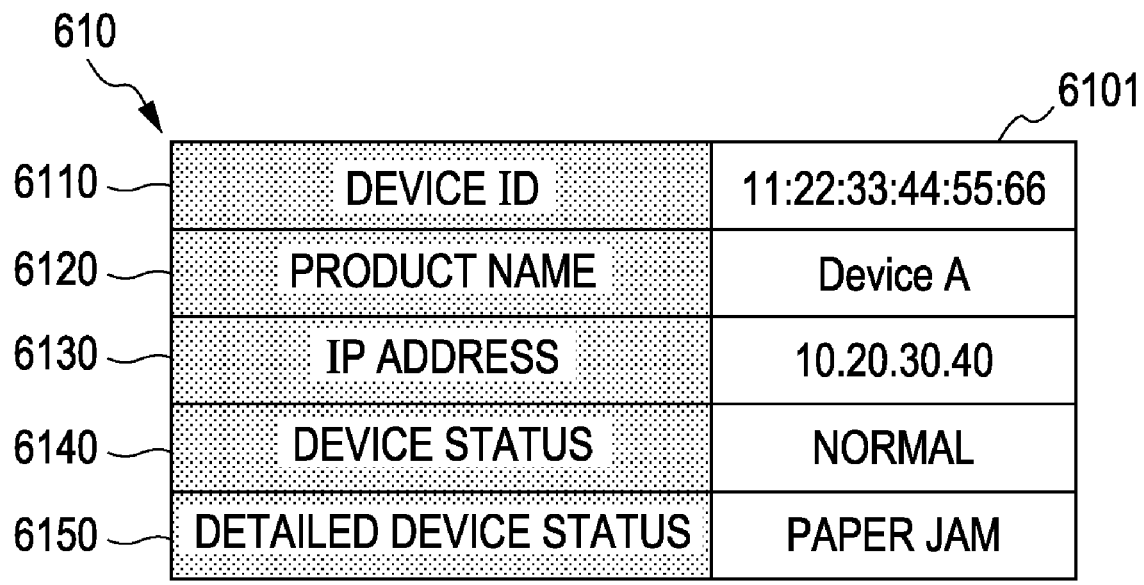

FIGS. 6A and 6B illustrate exemplary device tables for storing device information managed by the old version and the new version of the information processing software. FIG. 6A illustrates an exemplary device table for storing device information used by the old version of the information processing software. In contrast, FIG. 6B illustrates an exemplary device table for storing device information used by the new version of the information processing software. A device table 600 is a device table of the old version. Device information 6001 is device information of the old version.

Each of the management data items is described next. A device ID 6010 is uniquely assigned to each of the devices. According to the present embodiment, the MAC address of a device is used for the value of the device ID. Examples of the management data items further include a product name 6020, an IP address 6030, and a device status 6040. The device status 6040 includes information representing one of "normal", "warning", "error", and "service call error".

A device table 610 is a device table of a new version. Device information 6101 is device information of the new version. A device ID 6110 is similar to the device ID 6010. A product name 6120 is similar to the product name 6020. An IP address 6130 is similar to the IP address 6030. A device status 6140 is similar to the device status 6040. Examples of the management data items further include a detailed device status 6150. The detailed device status 6150 includes detailed information when an error occurs in the device. In this example, the detailed device status 6150 includes information representing one of "paper jam", "no toner", and "door open".

FIGS. 7A and 7B illustrate exemplary task tables for storing information about a task executed by the old version and the new version of the information processing software. As used herein, the term "task" refers to an operation for issuing a command to at least one device. FIG. 7A illustrates an exemplary task table used by the old version of the information processing software. In contrast, FIG. 7B illustrates an exemplary task table used by the new version of the information processing software. In this example, a task that delivers a destination table is used. However, a variety of tasks, such as tasks that deliver resource data to a network device and that performs a management operation (e.g., changing the network setting of a network device) can be similarly defined in the task table.

A task table 700 is a task table of an old version. Task information 7001 is task information of the old version.

Each of the management data items is described next. A task ID 7010 is uniquely assigned to each of the tasks. According to the present embodiment, a sequential number is used for the value of the task ID. However, any unique number may be assigned to the task ID. Examples of the management data items further include a task name 7020, a user ID 7030 of a user who is an owner of the task, a device ID 7040 of a device to which the task submits a command, and task information 7050 specific to the task. In the present embodiment, a task that delivers a destination table to devices having device IDs "11:22:33:44:55:66" and "11:22:33:44:55:67" is used.

A task table 710 is a task table of a new version. Task information 7101 is task information of the new version. A task ID 7110 is similar to the task ID 7010. According to the present embodiment, a sequential number is used for the value of the task ID. However, any unique number may be assigned to the task ID. In addition, the task ID is not necessarily equal to the task ID of the old version. A task name 7120 is similar to the task name 7020. A user ID 7130 is similar to the user ID 7030. A device ID 7140 is similar to the device ID 7040. Task information 7150 is similar to the task information 7050.

FIGS. 8A and 8B illustrate exemplary destination listing tables for storing information about destination listings exchanged between the information processing software of an old version or a new version and the multifunction peripheral 104. More specifically, FIG. 8A illustrates an exemplary destination listing table used by the information processing software of an old version. In contrast, FIG. 8B illustrates an exemplary destination listing table used by the information processing software of a new version.

A destination listing table 800 is a destination listing table of an old version. The destination listing table 800 includes destination listing information 8001 of the old version. According to the present embodiment, a sequential number is used for the value of the destination table ID 8010. However, any unique number may be assigned to the destination table ID. Examples of the destination table information items further include a destination table name 8020, a user ID 8030 of a user who is an owner of the destination table, a destination ID 8040 of a destination associated with the destination table, and a device ID 8050 of a device that acquires the destination table. Note that, instead of acquiring the destination table information from a device, the destination table information can be generated by the information processing software. In such a case, the value of the device ID 8050 is null.

A destination listing table 810 is a destination listing table of a new version. The destination listing table 810 includes destination table information 8101 of the new version. A destination table ID 8110 is similar to the destination table ID 8010. According to the present embodiment, a sequential number is used for the value of the destination table ID 8110. However, any unique number may be assigned to the destination table ID. In addition, the destination table ID is not necessarily equal to the destination table ID of the old version. A destination table name 8120 is similar to the destination table name 8020. A user ID 8130 is similar to the user ID 8030. A destination ID 8140 is similar to the destination ID 8040. A device ID 8150 is similar to the device ID 8050.

FIGS. 9A and 9B illustrate exemplary destination tables for storing information about destinations indicated by the destination IDs 8040 and 8140 shown in FIG. 8. More specifically, FIG. 9A illustrates an exemplary destination table used by the old version of the information processing software. In contrast, FIG. 9B illustrates an exemplary destination table used by the new version of the information processing software.

A destination table 900 is a destination table of the old version. The destination table 900 includes destination information 9001 of the old version. A unique number is assigned to each of destination IDs 9010. According to the present embodiment, a sequential number is used for the value of the destination ID. However, any unique number may be assigned to the destination ID. Examples of the items of the destination information 9001 further include a destination type 9020. Possible values for the destination type 9020 are "FAX" and "E-mail". Examples of the items of the destination information 9001 further include a destination name 9030. In general, the destination name 9030 is a name used when a device transmits information to that destination. A data item 9040 is effective only when the destination type 9020 is "FAX". The data item 9040 indicates a FAX number. When the destination type 9020 is a value other than "FAX", the value of the data item 9040 is null. A data item 9050 is effective only when the destination type 9020 is "E-mail". The data item 9050 indicates an e-mail address. When the destination type 9020 is a value other than "E-mail", the value of the data item 9050 is null.

A destination table 910 is a destination table of a new version. The destination table 910 includes destination information 9101 of the new version. A destination ID 9110 is similar to the destination ID 9010. According to the present embodiment, a sequential number is used for the value of the destination ID. However, any unique number may be assigned to the destination ID. In addition, the destination ID is not necessarily equal to the destination ID of the old version. A destination type 9120 is similar to the destination type 9020. However, a value "I-Fax" can be additionally specified for the destination type 9120 of the new version. A destination name 9130 is similar to the destination name 9030. An item 9140 is similar to the data item 9040. A data item 9150 is similar to the data item 9050. A data item 9060 is added since the destination type 9120 of the new version is added in order to expand the function. The data item 9060 indicates an I-Fax address. The data item 9060 is effective only when the destination type 9120 is "I-Fax". When the destination type 9120 has a value other than "I-Fax", the value of the data item 9060 is null.

FIG. 10 illustrates an exemplary processing progress information table.

According to the present embodiment, the processing progress information updating function 424 updates the processing progress information table so as to manage the progress of data migration processing. In addition, the processing progress information acquiring function 413 acquires the information stored in the processing progress information table so that the processing progress information notifying function 414 notifies the user of the progress of the data migration processing.

In FIG. 10, a processing progress information table 1000 is shown.

Values 1001 indicate examples of the values of data items in the processing progress information table 1000. The processing progress information table 1000 includes a data migration status 1010. Possible values of the data migration status 1010 are "ready for data migration", "migration in progress", "migration completed", and "migration failed". The processing progress information table 1000 further includes a processing progress 1020. The processing progress 1020 indicates the ratio of the amount of migrated data to the total amount of data to be migrated. The processing progress may be computed on the basis of the size of data to be migrated or the number of data items to be migrated. Alternatively, the processing progress may be computed using any other method. The processing progress information table 1000 further includes a plug-in ID 1030. When the data of a plug-in installed additionally is migrated, the plug-in ID of the plug-in is stored. However, as in the present embodiment, when data of the information processing software is migrated, the value of the plug-in ID 1030 is set to 0. The plug-in ID is described in more detail below with reference to FIG. 16.

Execution of the information processing software 400 is described with reference to FIG. 11. In this processing, the information processing software 400 in the information processing apparatus 102 converts information used by the old version of the information processing software 400 into a format and a value corresponding to the information processing software 400 and registers the converted format and values in a database.

In step S1101, upon receiving a user instruction for a data migration process, the migration data presence determining function 411 collects connection information about the old version of the information processing software using the connection information collecting function 415. The collected information is stored in the database 432.

In step S1102, the migration data presence determining function 411 connects itself to the old version of the information processing software using the connection information collected in step S1101 and determines whether data managed by the old version of the information processing software includes data to be migrated. If data to be migrated is included, the processing proceeds to step S1103. However, if no data to be migrated is included, the processing illustrated by the flowchart is completed.

In step S1103, the data migration requesting function 412 starts the data migration module 420 so that the data migration module 420 is executed in a different process. The process performed by the started data migration module 420 is described below with reference to FIG. 12.

In step S1104, the processing progress information acquiring function 413 acquires the information in the processing progress information table 1000 stored in the database 432. The processing progress information acquiring function 413 then stores the acquired processing progress information in the RAM 203 with a tag of "previous information". Furthermore, the processing progress information notifying function 414 sends the processing progress information to the user via the web server 460.

In step S1105, it is determined whether the user has inquired about the processing progress information. The inquiry from the user is received by the processing progress information notifying function 414 via the web browser running on the client PC 103 and the web server 460. If the inquiry from the user is found, the processing proceeds to step S1106. However, if no inquiries from the user are found, the processing in step S1105 is repeated.

In step S1106, the processing progress information acquiring function 413 acquires the information in the processing progress information table 1000 stored in the database 432.

In step S1107, the processing progress information acquiring function 413 determines whether the data migration status 1010 in the processing progress information table 1000 acquired in step S1106 is "migration failed". In addition, the processing progress information acquiring function 413 compares the processing progress information table 1000 with the information stored with a tag "previous information" stored in the RAM 203 in step S1104. If the data migration status 1010 in the processing progress information table 1000 is "migration failed" or the processing progress information table 1000 is equal to the information with a tag "previous information" stored in the RAM 203, the processing proceeds to step S1108. Otherwise, the processing proceeds to step S1109. Note that, if the processing progress information table 1000 is equal to the information with a tag "previous information" stored in the RAM 203, it can be considered that the data migration process does not proceed due to, for example, a communication error even after a certain period of time has elapsed.

In step S1108, the processing progress information notifying function 414 notifies the user of the failure of data migration process and completion of the data migration process via the web server 460. Subsequently, the processing of the flowchart is completed.

In step S1109, the processing progress information acquiring function 413 overwrites the information having a tag "previous information" stored in the RAM 203 with the processing progress information table 1000 acquired in step S1106.

In step S1110, the processing progress information acquiring function 413 determines whether the data migration status 1010 in the processing progress information table 1000 acquired in step S1106 is "migration completed". If the data migration status 1010 is "migration completed", the processing proceeds to step S1111. Otherwise, the processing proceeds to step S1112.

In step S1111, the processing progress information notifying function 414 notifies the user of successful completion of the data migration process via the web server 460. Subsequently, the processing of the flowchart is completed.

In step S1112, the processing progress information notifying function 414 notifies the user of data migration in progress via the web server 460. Subsequently, the processing returns to step S1105.

As described above, the processing of the flowchart is performed.

Figure 11:
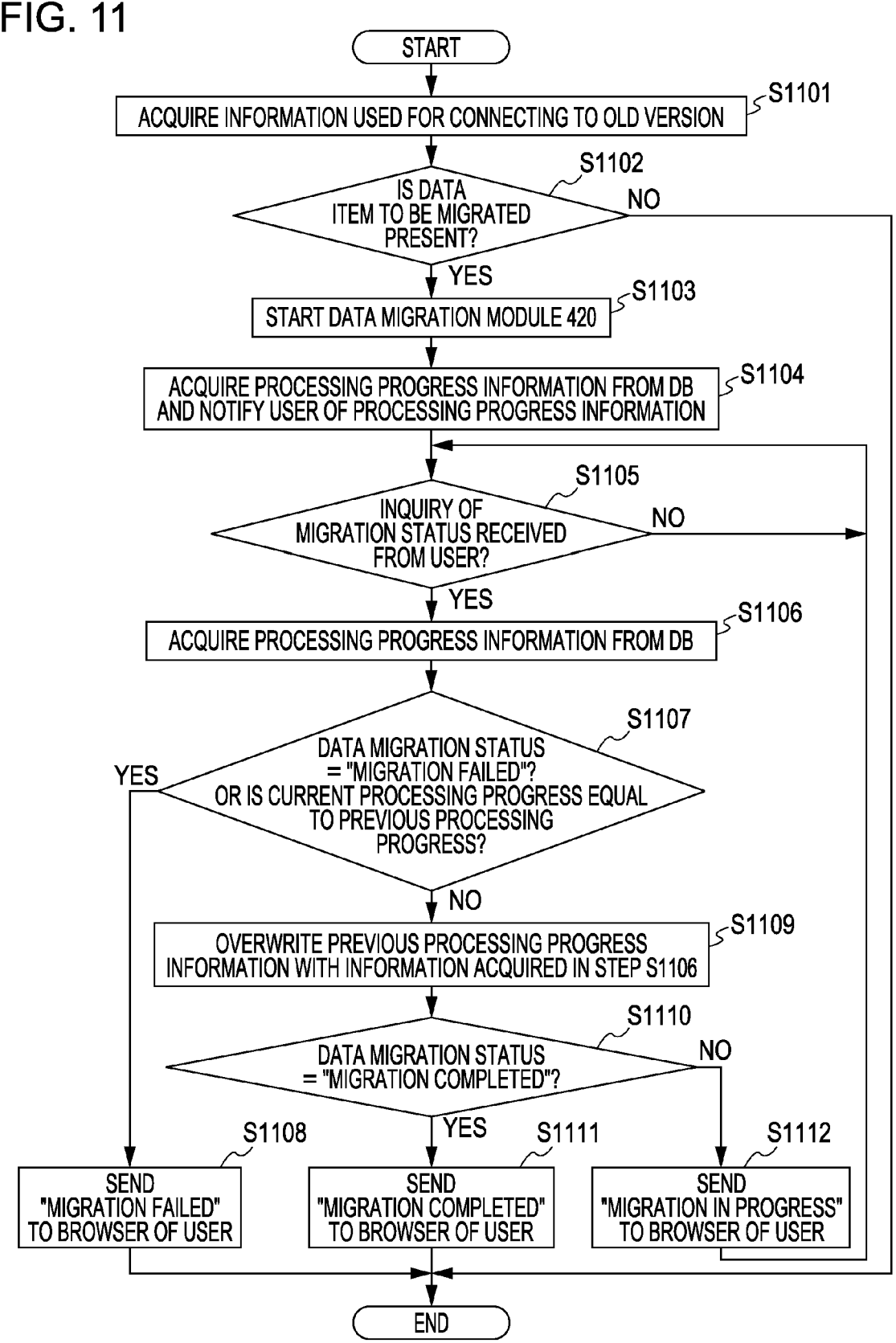
FIG. 11 is a flowchart of main processing according to the first exemplary embodiment of the present invention.

An exemplary processing performed by the information processing software 400 in step S1103 of FIG. 11 is described next with reference to a flowchart of FIG. 12. In this processing, the control module 410 generates a different process that performs processing of the data migration module 420. More specifically, the CPU 201 loads a program of the data migration module 420 from the HD 211 into the RAM 203 and executes the program.

Figure 12:
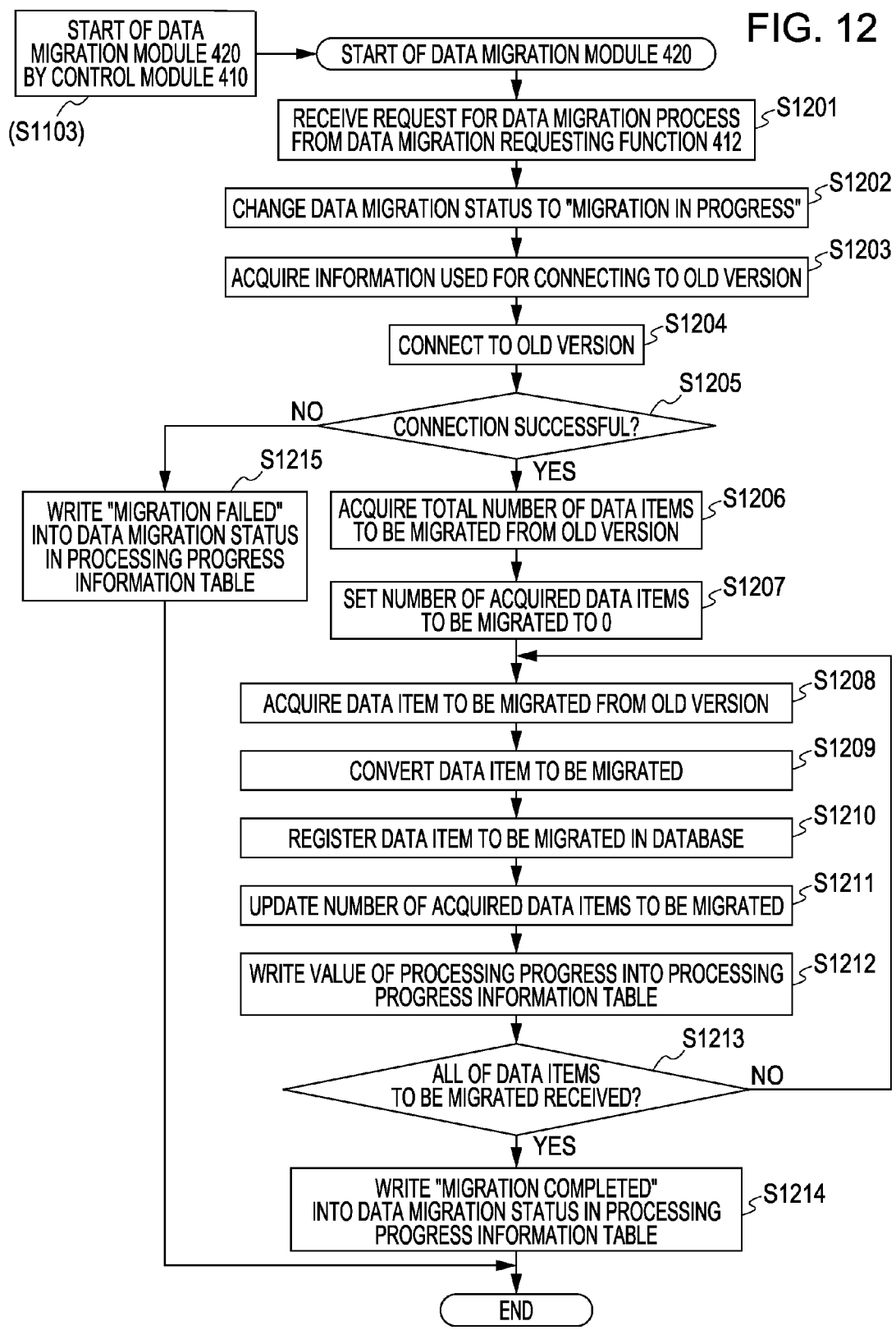
FIG. 12 is a flowchart of an exemplary operation of a data migration module according to the first exemplary embodiment of the present invention.

As shown in FIG. 12, in step S1201, the data migration module 420 receives a data migration request from the data migration requesting function 412.

In step S1202, the processing progress information updating function 424 changes the data migration status 1010 in the processing progress information table 1000 stored in the database 432 to "migration in progress". In addition, the processing progress information updating function 424 sets the processing progress 1020 to "0%". In the present embodiment, the processed ratio is represented as a percent. However, the representation of the processed ratio is not limited to a percent.

In step S1203, the connection information acquiring function 425 acquires the connection information stored in the database 432 in step S1101 of FIG. 11 and stores the connection information in the RAM 203.

In step S1204, the migration data acquiring function 421 connects itself to the old version of the information processing software via the communication function 435 using the communication information stored in the RAM 203 in step S1203.

In step S1205, it is determined whether the connection of the migration data acquiring function 421 to the old version of the information processing software is successful. If the connection is successful, the processing proceeds to step S1206. However, the connection is failed, the processing proceeds to step S1215.

In step S1206, the migration data acquiring function 421 acquires the total number of data items to be migrated from the old version of the information processing software and stores the total number in the RAM 203. The total number may be the number of data items to be migrated or the total data size of the data items to be migrated. Alternatively, any value other than these numbers may be used.

In step S1207, the migration data acquiring function 421 sets the number of acquired data items to be migrated to zero. The migration data acquiring function 421 then stores this number in the RAM 203.

In step S1208, the migration data acquiring function 421 acquires the data items to be migrated from the old version of the information processing software and stores these data items in the RAM 203.

In step S1209, the migration data conversion function 422 converts the data items to be migrated acquired in step S1208 into a format that complies with the new version of the information processing software. More specifically, tables and values of an old version to be migrated shown in FIGS. 5A, 6A, ..., and 9A are converted into tables and values of a new version shown in FIGS. 5B, 6B, ..., and 9B, respectively.

At that time, among these items of the tables, a user ID, a task ID, a destination table ID, and a destination ID may be changed by the database 432 for a data management purpose. For example, when the old version of the information processing software is running and if user information is generated and, subsequently, deleted, one of the sequential numbers assigned to the user ID may be missing. If the user table 500 includes such data, sequential numbers are newly assigned to the user IDs in the user table 510 of a new version.

In addition, if each of the tables contains an item that is present in the old version, but is not present in the new version, the item is discarded. Conversely, if each of the tables contains an item that is not present in the old version, but is present in the new version, the value of the item of the new version is set to "null".

In step S1210, the migration data registering function 423 registers, in the database 432, the data to be migrated converted in step S1209.

In step S1211, the number of the data items to be migrated acquired by the migration data acquiring function 421 in step S1208 is added to the number of acquired data items stored in the RAM 203. Thus, the total number of the data items to be migrated is updated.

In step S1212, the connection information acquiring function 425 updates the value of the processing progress 1020 in the processing progress information table 1000. More specifically, by dividing the number of data items to be migrated updated in step S1211 by the total number acquired in step S1206, the connection information acquiring function 425 can compute the percentage of migration that has been completed. In addition, the connection information acquiring function 425 stores the computed percentage of migration that has been completed in the database 432.

In step S1213, the migration data acquiring function 421 determines whether it has received all of the data items to be migrated. In general, the migration data acquiring function 421 determines whether the total number of the data items to be migrated stored in the RAM 203 is equal to the number of the acquired data items to be migrated. Alternatively, the migration data acquiring function 421 may determine whether the processing progress 1020 in the processing progress information table 1000 computed in step S1212 indicates "100%". If it is determined that all of the data items to be migrated have been received, that is, if it is determined that the total number of the data items to be migrated is equal to the number of the acquired data items to be migrated or the processing progress 1020 indicates "100%", the processing proceeds to step S1214. Otherwise, the processing returns to step S1208.

In step S1214, the processing progress information updating function 424 changes the data migration status 1010 in the processing progress information table 1000 to "migration completed".

In step S1215, the processing progress information updating function 424 changes the data migration status 1010 in the processing progress information table 1000 to "migration failed". Note that this step is performed when it is determined in step S1205 that the connection to the old version of the information processing software performed by the migration data acquiring function 421 fails.

As described above, the processing of the flowchart is performed and completed.

FIG. 13 illustrates an exemplary screen used for notifying the user of the execution result and displayed on the display 210 of the information processing apparatus 102. In FIG. 13, a data migration result notification screen 1300 is illustrated.

In the data migration result notification screen 1300, a data migration message 1301 corresponding to the value of the data migration status 1010 in the processing progress information table 1000 is displayed. In FIG. 13, a message corresponding to the value "migration successful" is displayed. In addition, appropriate messages corresponding to the values "migration in progress" and "migration failed" may be displayed. Furthermore, the data migration message 1301 may additionally display the total number of data items to be migrated and the number of acquired data items to be migrated.

Example of Application of Present Embodiment

When software is installed, a module that migrates data is started so that the module is executed in a different process. Thus, data used in an old version and required for the new version is migrated.

For example, in the Internet and an intranet environment, if a long time is consumed for data migration processing, timeout of a screen displayed by a browser may occur. In such a case, the progress of the migration processing may not be informed to the user.

Accordingly, in this example, the present embodiment is applied to the Internet/intranet environment. As noted above, the migration data presence determining function 411 determines whether a data item that can be migrated is present, and the data migration requesting function 412 starts the data migration module 420 so that the data migration module 420 is executed in a different process. In addition, the data migration requesting function 412 notifies the data migration module 420 running in a different process of the processing progress so that the data migration module 420 can update the processing progress information table 1000.

By using such a configuration, the above-described timeout problem can be solved even when a software installation process including a data migration sub-process of a large amount of data is performed in the Internet and an intranet environment. Thus, the progress of data migration and software installation can be appropriately informed to the user via a screen.

In this way, the present embodiment is applied.

A second exemplary embodiment of the present invention is described below with reference to the accompanying drawings.

In the second exemplary embodiment, the operation performed when a plug-in additionally installed in the information processing software 400 after the information processing software 400 is upgraded to a new version and operated for a while in the first exemplary embodiment is described. While the present exemplary embodiment is described with reference to a plug-in having a function of transmitting and receiving a destination table, the present exemplary embodiment can be applied to a plug-in having a different function.

In addition, since the information processing software 400 has been operated with the additional plug-in uninstalled for a certain period of time, the data contained in the tables shown in FIGS. 5A to 7A may be different from the data of the old version of the information processing software 400.

FIGS. 1 to 3 of the first exemplary embodiment can be applied to the second exemplary embodiment and, therefore, the descriptions are not repeated.

The plug-in module 440, the plug-in data acquiring function 441, the plug-in data conversion function 442, and the plug-in processing function 443 shown in FIG. 4 are described below. The other functions are similar to those of the first exemplary embodiment.

In response to a user instruction, a plug-in is additionally installed in the information processing software 400. Accordingly, the plug-in 440 is disposed in the information processing software 400.

FIG. 14 illustrates an example of a screen operated by the user when the user installs a plug-in in the information processing software 400.

As shown in FIG. 14, a plug-in installation screen 1400 includes a plug-in name input text box 1401, a device data reacquisition request check box 1402, an "OK" button 1403, and a "Cancel" button 1404. The plug-in name input text box 1401 is used for inputting the file name of a plug-in. The device data reacquisition request check box 1402 is used for instructing whether the data contained in the device table 600 is to be updated when the plug-in is installed. If the check box is checked, communication is performed with a device in the network using an SNMP protocol. The "OK" button 1403 activates the value in the plug-in name input text box 1401 input by the user. The "Cancel" button 1404 is used for discarding the value in the plug-in name input text box 1401 input by the user.

When the user inputs a correct plug-in file name into the plug-in name input text box 1401 shown in FIG. 14 and presses the "OK" button 1403, the plug-in 440 is disposed in the information processing software 400.

Referring back to FIG. 4, the operation is described.

As shown in FIG. 4, the plug-in 440 has the plug-in data acquiring function 441. By accessing the migration data acquiring function 421, the plug-in data acquiring function 441 acquires data of a plug-in of an old version to be migrated.

The plug-in data conversion function 442 converts the data to be migrated acquired by the plug-in data acquiring function 441 into a specified format of a new version.

The plug-in processing function 443 performs a process specific to the plug-in 440. In the present embodiment, a process of transmitting and receiving a destination table of the multifunction peripheral 104 is described as an example. In this case, the plug-in processing function 443 submits a destination table acquisition command or a destination table delivery command to the multifunction peripheral 104.

The following process performed by the information processing software 400 is described below with reference to a flowchart shown in FIG. 15: a plug-in is additionally installed, and data of a plug-in to be migrated is migrated from the old version of the information processing software 400.

In step S1501, the information processing software 400 receives information input into the plug-in name input text box 1401 and the device data reacquisition request check box 1402 of the plug-in installation screen 1400. The information processing software 400 then stores the received information in the RAM 203.

In step S1502, a plug-in is additionally installed. More specifically, first, the information processing software 400 receives, via the web server 460, a file specified through the plug-in name input text box 1401 and located on a client PC of the user. Subsequently, if the file is compressed, the information processing software 400 decompresses the file and stores the decompressed file in the HD 211 at an appropriate location. Finally, the information processing software 400 stores the information about the plug-in in the database 432 via the plug-in management function 434.

FIG. 16 illustrates an example of the plug-in information stored in the database 432.

In FIG. 16, a plug-in information table 1600 is illustrated. Fields 1601 indicate example of the values stored in the plug-in information table 1600. A plug-in ID 1610 is a value uniquely assigned to each of the plug-ins. In the present exemplary embodiment, a sequential number is assigned. However, any value that is unique can be assigned to the plug-in ID 1610. The plug-in information table 1600 further includes a plug-in name 1620, a storage location 1630, and a plug-in status 1640. The storage location 1630 indicates the location in the information processing apparatus 102 at which the plug-in is installed. Examples of the plug-in status include "Stop", "Started", "Data migration in progress", and "Data migration failed". If the processing progress information table 1000 includes the information equal to the value of the plug-in ID 1610 and the data migration status 1010 in that information is "migration in progress" or "migration failed", the value of the plug-in status 1640 is changed to "Data migration in progress" or "Data migration failed". This change is performed by the plug-in management function 434.

Referring back to FIG. 15, the operation is further described.

Since steps S1503 to S1514 are similar to steps S1101 to S1112 shown in FIG. 11, respectively, the descriptions are not repeated. However, when notification is performed to the user in step S1510, S1513, or S1514, notification associated with the plug-in information table 1600 is performed.

In this way, the processing of the flowchart is completed.

Figure 15:
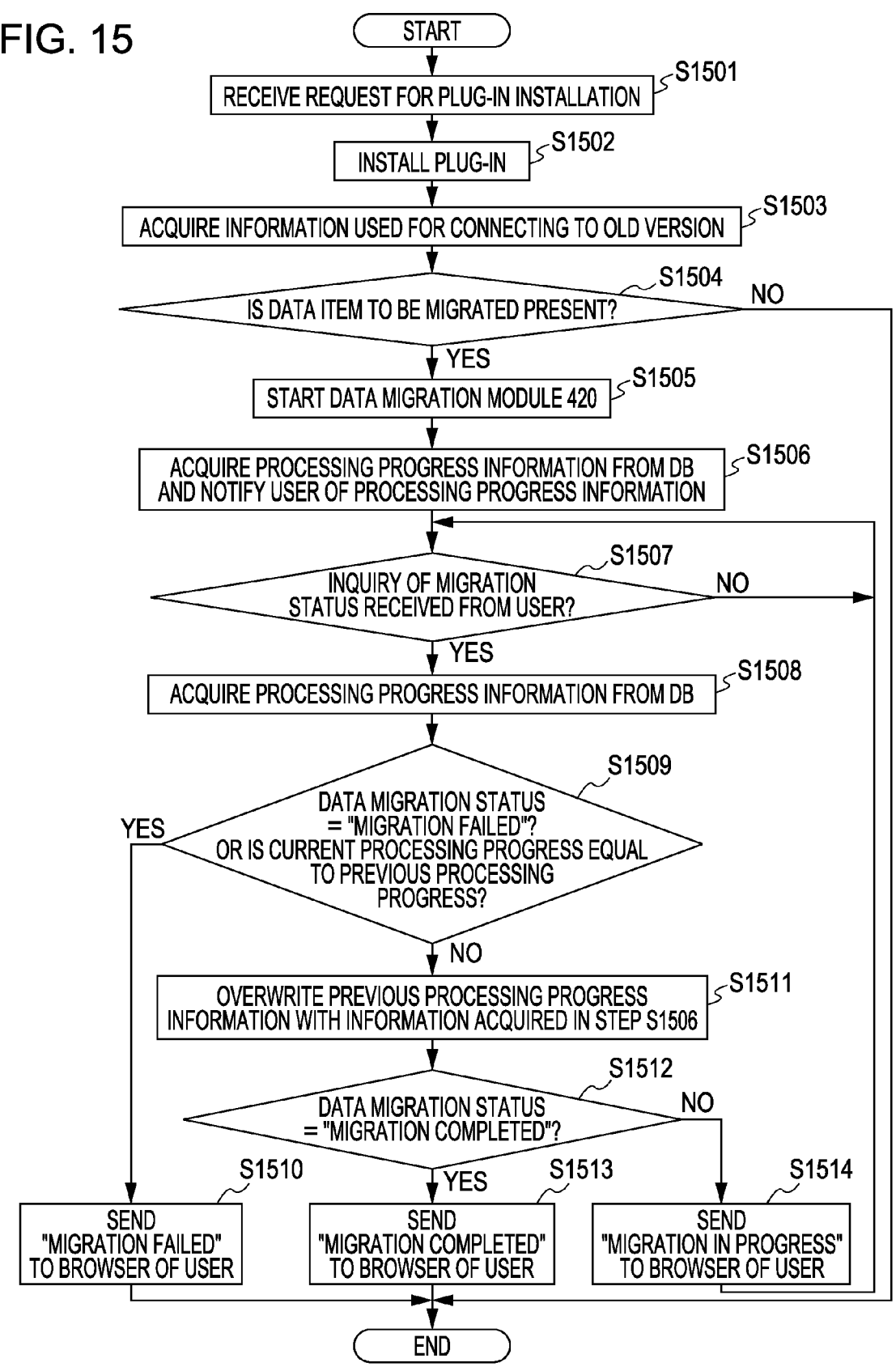
FIG. 15 is a flowchart of main processing according to a second exemplary embodiment of the present invention.
Figure 17:
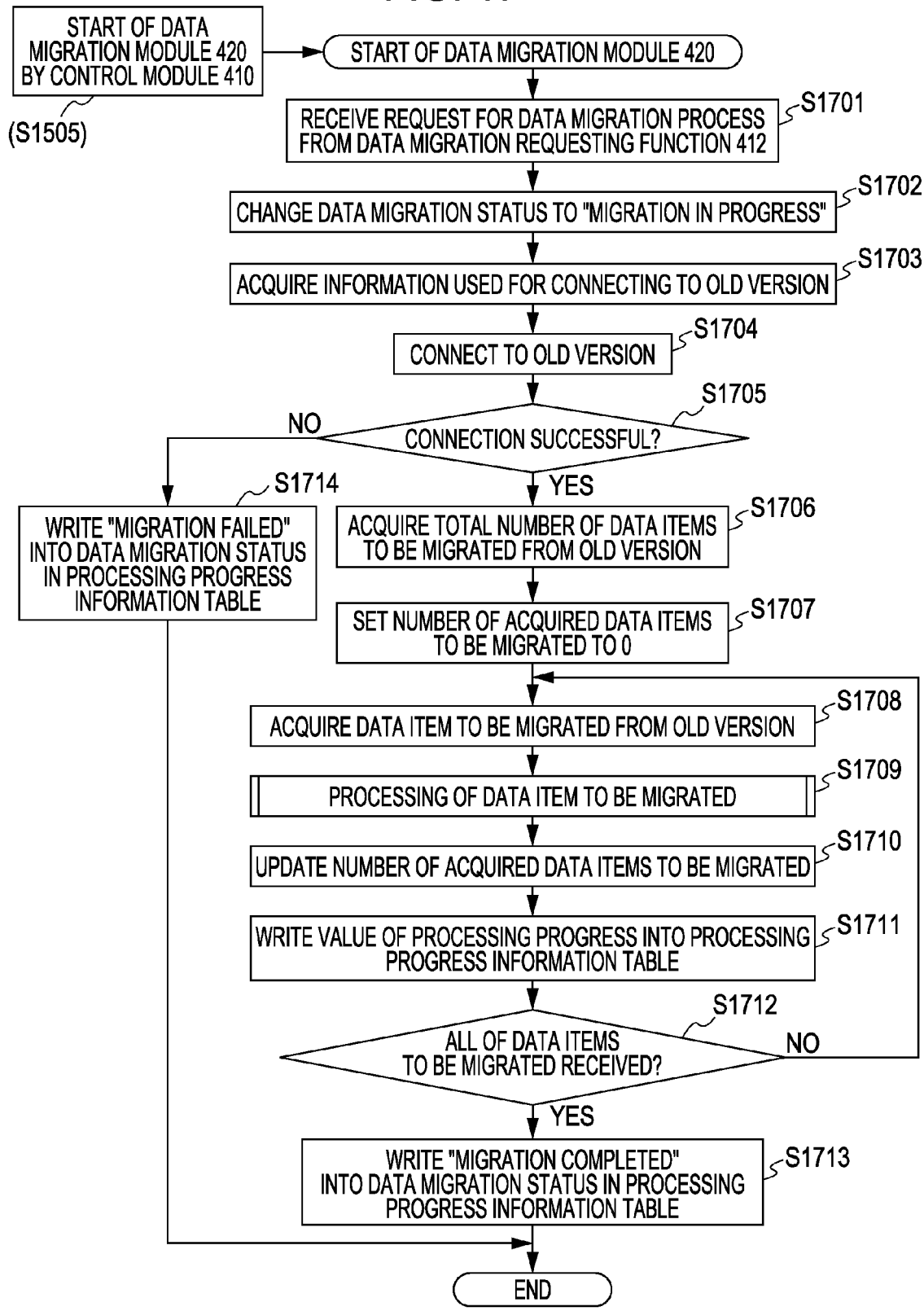
FIG. 17 is a flowchart of an exemplary operation of a data migration module according to the second exemplary embodiment of the present invention.

Exemplary processing performed when the control module 410 of the information processing software 400 generates a process of the data migration module 420 in step S1505 shown in FIG. 15 is described next with reference to a flowchart shown in FIG. 17. More specifically, the CPU 201 loads a program of the data migration module 420 and a program of the plug-in 440 from the HD 211 into the RAM 203 and executes the program of the data migration module 420 and the program of the plug-in 440.

Since steps S1701 to S1708 are similar to steps S1201 to S1208 shown in FIG. 12, respectively, the descriptions are not repeated. However, the migration data acquiring function 421 receives the information about data to be migrated from the plug-in data acquiring function 441 and executes an acquisition process on the basis of the received information.

In step S1709, the data to be migrated is processed. The data to be migrated acquired in step S1708 is converted and registered. This processing is described in more detail below with reference to a flowchart shown in FIG. 18.

Since steps S1710 to S1714 are similar to steps S1211 to S1215 shown in FIG. 12, respectively, the descriptions are not repeated.

In this way, the processing of the flowchart is completed.

The processing performed in step S1709 is described in detail next with reference to the flowchart shown in FIG. 18.

In step S1801, the plug-in data conversion function 442 determines the type of the data to be migrated. If the type of the data to be migrated is task data, the processing proceeds to step S1802. If the type of the data to be migrated is destination table data, the processing proceeds to step S1808. Otherwise, the processing proceeds to step S1813.

In step S1802, the plug-in data conversion function 442 determines whether the user ID 7030 of the task data to be migrated is present in the user table 510 stored in the database 432. If the user ID 7030 is present, the processing proceeds to step S1803. However, if the user ID 7030 is not present, the processing proceeds to step S1815.

In step S1803, the plug-in data conversion function 442 determines whether the device ID 7040 of the task data to be migrated is present in the device table 610 stored in the database 432. If the device ID 7040 is present, the processing proceeds to step S1804. However, if the device ID 7040 is not present, the processing proceeds to step S1807.

In step S1804, the plug-in processing function 443 determines whether it has received a device data reacquisition request. More specifically, the plug-in processing function 443, in step S1501 shown in FIG. 15, examines the value based on the device data reacquisition request check box 1402 that is used for instructing reacquisition of the device data stored in the RAM 203. If the device data reacquisition request check box 1402 is checked, the processing proceeds to step S1805. However, if the device data reacquisition request check box 1402 is not checked, the processing proceeds to step S1813.

In step S1805, the plug-in processing function 443 submits a device information reacquisition request to the network via the plug-in management function 434 and the communication function 435.

In step S1806, the plug-in processing function 443 determines whether it has received a response from a network device. If the plug-in processing function 443 has received a response, the plug-in processing function 443 determines that a network device is detected. Therefore, the processing proceeds to step S1812. However, if the plug-in processing function 443 has received no response from a network device, the plug-in processing function 443 determines that no network device is detected. Therefore, the processing proceeds to step S1807.

In step S1807, the plug-in data conversion function 442 deletes the device ID from the task data. Thereafter, the processing proceeds to step S1813.

Processing performed in step S1808 is described next. This processing is performed when it is determined in step S1801 that the type of the data to be migrated is destination table data.

In step S1808, the plug-in data conversion function 442 determines whether the device ID 8050 of the destination table data to be migrated is present in the device table 610 stored in the database 432. If the device ID 8050 is present, the processing proceeds to step S1809. However, if the device ID 8050 is not present, the processing proceeds to step S1816.

Figure 18:
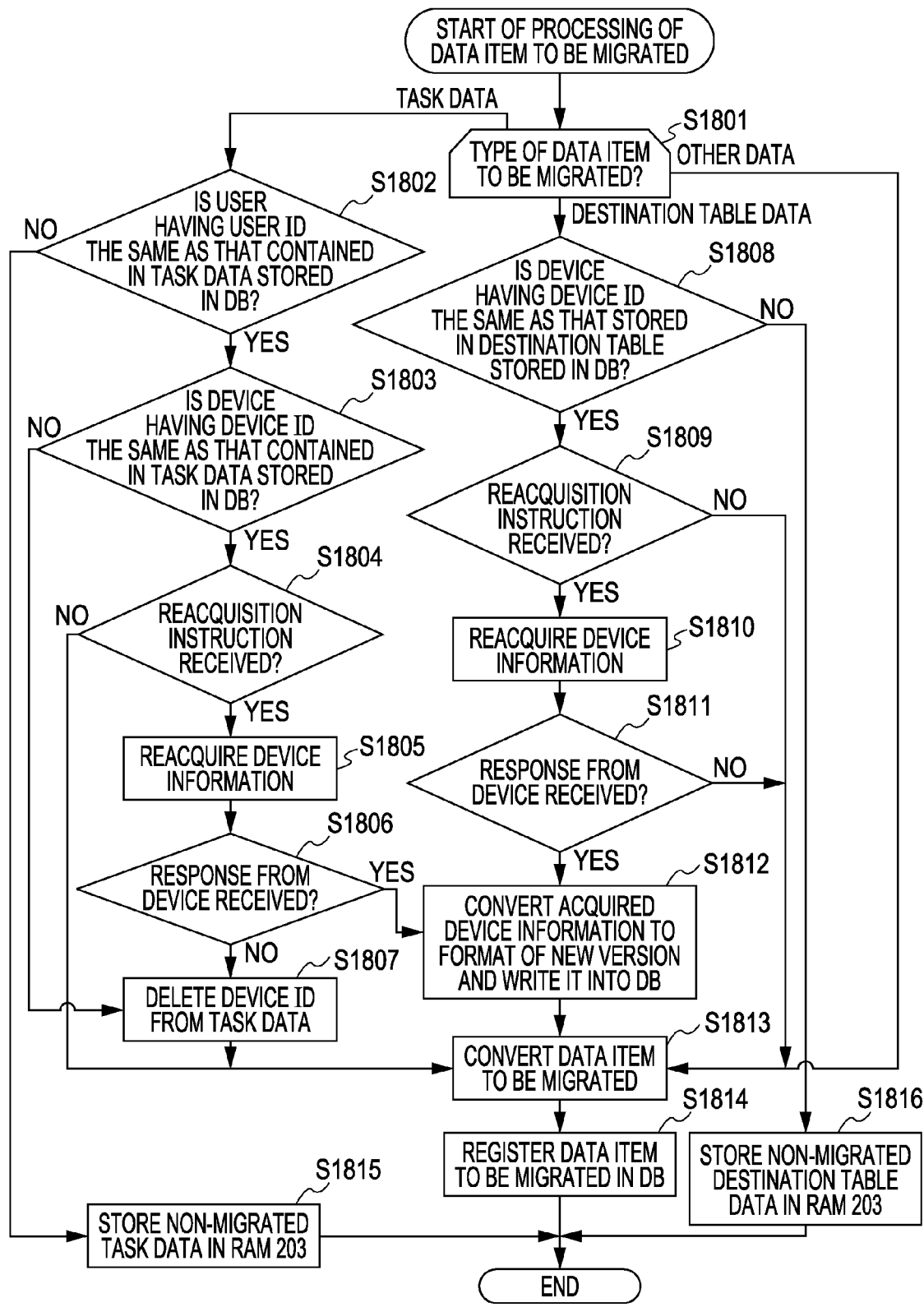
FIG. 18 is a continuation of the flowchart of FIG. 17.

The processing performed in step S1809 is similar to that in step S1804 shown in FIG. 18. If the device data reacquisition request check box 1402 is checked, the processing proceeds to step S1810. However, if the device data reacquisition request check box 1402 is not checked, the processing proceeds to step S1813.

Since the processing performed in step S1810 is similar to that in step S1805 shown in FIG. 18, the description is not repeated.

The processing performed in step S1811 is similar to that in step S1806 shown in FIG. 18. If a response from a network device is received, it is determined that a network device is detected. Accordingly, the processing proceeds to step S1812. However, if no response from a network device is received, it is determined that a network device is not detected. Accordingly, the processing proceeds to step S1813.

The processing in step S1812 is performed when a response is received from a device in step S1806 or S1811. In step S1812, the plug-in data conversion function 442 receives device data received by the plug-in processing function 443 in step S1805 or S1810. The plug-in data conversion function 442 then delivers the device data to the migration data conversion function 422. The migration data conversion function 422 converts the device data in the same manner as that in step S1209 shown in FIG. 12. Thereafter, the migration data conversion function 422 stores the converted device data in the database 432 via the migration data registering function 423.

Since the processing performed in steps S1813 and S1814 is similar to that in steps S1209 to S1210 shown in FIG. 12, the descriptions are not repeated.

The processing performed in steps S1815 and S1816 is described next. In these steps, the plug-in data conversion function 442 stores, in the RAM 203, task data and destination table data that are determined not to be migrated in steps S1802 and S1808.

In step S1802, task data of an old version generated and registered by a user who is not registered in the user information manipulated by the new version of the information processing software 400 is not migrated. However, instead of not migrating the task data, the user ID of an administrator of a network (a system) including the information processing apparatus having the information processing software 400 running therein may be added to the task data as a user ID or a user name and, subsequently, the task data may be migrated. This method allows flexible migration of task data for network device management.

In this way, the processing of the flowchart is completed.

Figure 19:
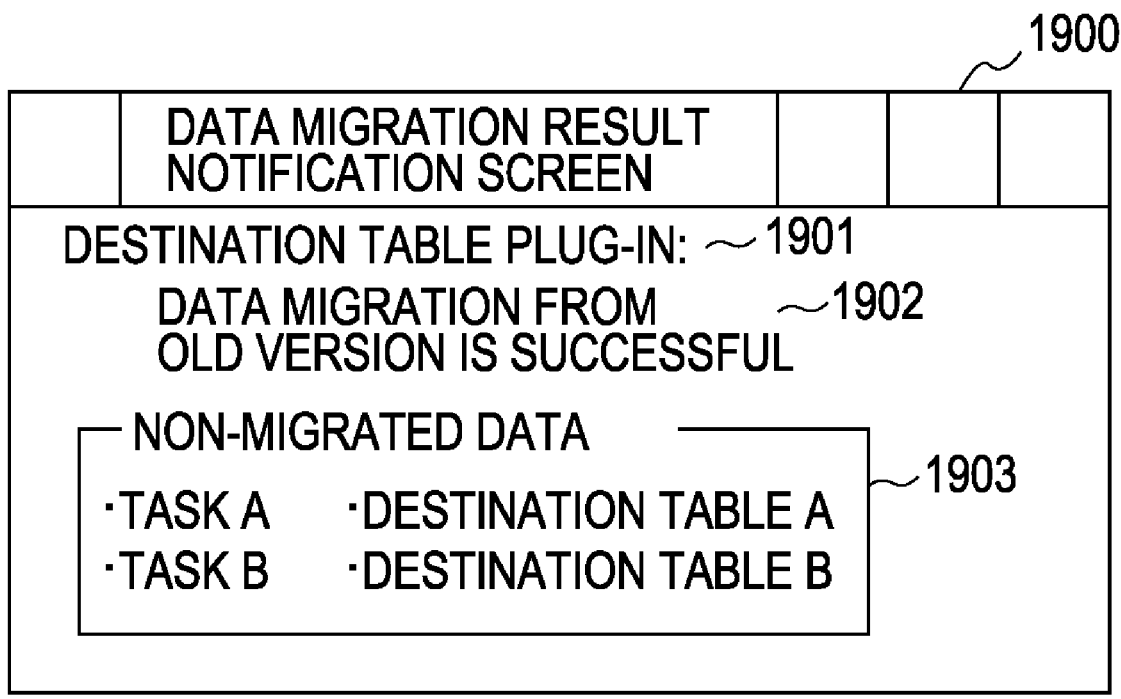
FIG. 19 illustrates an exemplary data migration result notification screen according to the second exemplary embodiment of the present invention.

FIG. 19 illustrates an example of a screen displayed on the display 210 of the information processing apparatus 102 in order to inform the user of the processing result of the present exemplary embodiment.

In FIG. 19, a data migration result notification screen 1900 is illustrated.

The data migration result notification screen 1900 includes a plug-in name field 1901 that displays the name of a plug-in that performed data migration. That is, the plug-in name field 1901 displays the value of the plug-in name 1620 in the plug-in information table 1600.

A data migration message field 1902 displays an appropriate message corresponding to the value of the data migration status 1010 in the processing progress information table 1000.

In FIG. 19, a message "migration successful" is displayed. However, an appropriate message is displayed in accordance with a "migration in progress" state or a "migration failed" state. The data migration message may further display the total number of data items to be migrated and the number of acquired data items to be migrated.

A list field 1903 displays, in a list format, the data items that are stored in the RAM 203 and that are not migrated in steps S1815 and S1816 of FIG. 18.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-317281 filed Dec. 7, 2007, which is hereby incorporated by reference herein in its entirety.

What is claimed is:

1. An information processing apparatus configured to allow first software to be executed therein, the first software managing a network device communicable via a network using management information regarding the network device stored in a database, the apparatus comprising:
    a data migrating unit configured to acquire management information in a second format corresponding to second software of a version different from a version of the first software, convert the management information in the second format into a first format corresponding to the first software, and register the converted management information in the database, wherein the management information includes user information of a user who is accessible to the network device; and
    a control unit configured to receive an instruction of performing a data migration processing, in which the management information in the second format is migrated to data used by the first software, and start the data migrating unit in accordance with the received instruction such that the data migrating unit runs in a first process different from a second process in which the control unit runs,
    wherein the data migrating unit converts the management information by adding a new value to a management item that is common to the first and second formats of the management information so that the value is suitable for the first software, and
    wherein the control unit includes (a) a migration state information acquiring unit configured to acquire information regarding a state of the migration of the management information performed by the data migrating unit and (b) a notifying unit configured to notify, on a screen displayed by a browser, a user of the state of the migration of the management information based on the acquired information, wherein the browser has a time-out setting for a display processing.

2. The information processing apparatus according to claim 1, wherein, when a management item of the format of the management information corresponding to the second software is not included in management items of the first format of the management information, the data migrating unit converts the management information by deleting the management item and a value of the management item and wherein, when a management item that is not included in the second format of the management information is included in management items of the first format of the management information, the data migrating unit converts the management information by setting the value of the management item to null.

3. The information processing apparatus according to claim 1, wherein the first software and the second software are capable of performing a management operation based on task data defining the management operation for the network device, and the control unit receives an instruction for a data migration process for converting task data in the second format into task data used by the first software, and wherein, upon being started, the data migrating unit acquires the task data in the second format, converts the acquired task data in the second format into the first format, and registers the converted task data in the database.

4. The information processing apparatus according to claim 3, wherein the task data includes information of the network device, and the data migrating unit includes a detecting unit configured to detect a network device communicable via the network, and wherein the data migrating unit converts task data by deleting information regarding a network device that is not detected by the detecting unit from information regarding network devices to be managed in accordance with a management operation defined by the acquired task data in the second format.

5. The information processing apparatus according to claim 3, wherein the management operation defined by the task data includes delivering a destination table for the network device.

6. A method for information processing for use in an information processing apparatus configured to allow first software to be executed therein, the first software managing a network device communicable via a network using management information regarding the network device stored in a database, the method comprising:
    migrating data by acquiring management information in a first process in a second format corresponding to second software of a version different from a version of the first software, converting the management information in the second format into a first format corresponding to the first software, and registering the converted management information in the database, wherein the management information includes user information of a user who is accessible to the network device; and
    performing control in a second process by receiving an instruction of performing a data migration processing, in which the management information in the second format is migrated to data used by the first software, and starting migrating data in accordance with the instruction such that the first process is different from the second process,
    wherein, in migrating data, the management information is converted by adding a new value to a management item that is common to the first and second formats of the management information so that the value is suitable for the first software, and
    wherein performing control includes (a) acquiring information regarding a state of the migration of the management information, and (b) notifying, on a screen displayed by a browser, a user of the state of the migration of the management information based on the acquired information, wherein the browser has a time-out setting for a display processing.

7. The method according to claim 6, wherein, when a management item of the format of the management information corresponding to the second software is not included in management items of the first format of the management information, the management information, in migrating data, is converted by deleting the management item and a value of the management item and wherein, when a management item that is not included in the second format of the management information is included in management items of the first format of the management information, the management information, in migrating data, is converted by setting the value of the management item to null.

8. The method according to claim 6, wherein the first software and the second software are capable of performing a management operation based on task data defining the management operation for the network device, and wherein, when an instruction for a data migration process for converting task data in the second format into task data used by the first software is received in performing control, migrating data is started, and wherein, in migrating data, the task data in the second format is acquired, the acquired task data in the second format is converted into the first format, and the converted task data is registered in the database.

9. The method according to claim 8, wherein the task data includes information about a network device to be managed, and migrating data involves detecting a network device communicable via the network, and wherein, in migrating data, task data is converted by deleting information regarding a network device that is not detected in detecting a network device from information regarding network devices to be managed in accordance with a management operation defined by the acquired task data in the second format.

10. The method according to claim 8, wherein the management operation defined by the task data includes delivering a destination table for the network device.

11. A computer-readable storage medium encoded with a computer-executable program for causing a computer to execute the method according to claim 6.

12. A method for information processing for use in an information processing apparatus configured to allow first software to be executed therein, the first software managing a network device communicable via a network using management information regarding the network device stored in a database, the method comprising:

migrating data by acquiring management information in a first process in a format corresponding to second software of a version different from a version of the first software, converting the management information in a format corresponding to the second software into a format corresponding to the first software, and registering the converted management information in the database, wherein the management information includes user information of a user who is accessible to the network device; and performing control in a second process in response to receiving an instruction of performing a data migration processing, in which the management information in the second format is migrated to data used by the first software, and starting migrating data in accordance with the instruction such that the first process is different from the second process, wherein performing control includes (a) acquiring information regarding a state of the migration of the management information, and (b) notifying, on a screen displayed by a browser, a user of the state of the migration of the management information based on the acquired information, wherein the browser has a time-out setting for a display processing.

13. A computer-readable storage medium encoded with a computer-executable program for causing a computer to execute the method according to claim 12.

* * * * *